March 24, 1970 W. A. HOFMANN 3,501,984
THREADING ATTACHMENT

Filed Sept. 15, 1966 2 Sheets-Sheet 1

INVENTOR
WALTER A. HOFMANN
BY Yount, Raney, Flynn & Torolli
ATTORNEYS

INVENTOR
WALTER A. HOFMANN
BY Young, Henry
Flynn & Tarolli
ATTORNEYS

United States Patent Office 3,501,984
Patented Mar. 24, 1970

3,501,984
THREADING ATTACHMENT
Walter A. Hofmann, Lyndhurst, Ohio, assignor to The Warner & Swasey Company, Cleveland, Ohio, a corporation of Ohio
Filed Sept. 15, 1966, Ser. No. 579,777
Int. Cl. B23g 1/00
U.S. Cl. 82—5                                   20 Claims

ABSTRACT OF THE DISCLOSURE

Apparatus for threading a workpiece includes a machine tool having a rotatable spindle for rotating a workpiece and a cross-slide for movement toward and away from the axis of rotation of the workpiece. The apparatus includes a threading attachment mounted on the cross-slide. The threading attachment includes a longitudinal slide movable parallel to the axis of rotation of the workpiece and a drive mechanism for effective movement of the longitudinal slide. The drive mechanism includes a clutch having an input clutch member drivingly connected with the drive of the spindle and an output clutch member movable with the cross-slide so that the output clutch member is movable into a position adjacent to the input clutch member upon movement of the cross-slide to effect formations of threads in the workpiece.

---

The present invention relates to an apparatus for cutting threads in a workpiece, and particularly relates to a single point threading attachment for a machine tool.

Known threading attachments for a machine tool include a tool slide which carries a cutter which is engageable with a rotating workpiece. The tool slide is moved along the axis of rotation of the workpiece in a work pass or stroke to effect cutting of threads in the workpiece. At the end of the work stroke, the cutting tool is withdrawn from the workpiece by movement in a direction away from the axis of rotation of the workpiece, and is then moved in a return stroke in a direction opposite to its direction of its movement in its work stroke. After the tool has moved through its return stroke, it is then moved through an infeed stroke inwardly toward the axis of rotation of the workpiece into a position for effecting the next work pass. When making the next work stroke or pass, the tool is generally projected further inwardly toward the axis of the workpiece in order to cut a deeper thread in the workpiece. The cycle of movement of the cutter is continued until the proper depth thread is cut in the workpiece, at which time the threading operation is discontinued.

A general object of the present invention is the provision of a new and improved apparatus for cutting threads in a rotating workpiece, as noted above, and wherein a cutter is moved in a path which includes a work stroke to effect cutting of the workpiece, a withdrawal stroke at the end of the cutting stroke, a return stroke, and an infeed stroke which positions the cutter for movement in another work stroke and wherein the apparatus is operative to produce precise accurate threads, requires little operator attention, has a fully automatic thread cutting cylinder, is durable, and is readily capable of producing all types of threads.

A further object of the present invention is the provision of a new and improved machine tool for cutting threads in a workpiece and which includes a spindle for supporting and rotating the workpiece and a turret for carrying tools for operating on the workpiece and which is movable longitudinailly along the axis of the spindle and indexible about an axis substantially parallel to the spindle axis and which includes a cross slide movable transverse to the axis of the spindle and which has a thread cutting attachment supported thereon and movable therewith, which thread cutting attachment includes a tool slide movable in work, withdrawal, return, and infeed strokes relative to the cross slide to effect cutting of threads in the workpiece.

A further object of the present invention is the provision of a new and improved machine tool having a spindle for supporting and rotating a workpiece and a cross slide fixed against movement in a direction parallel to the axis of the workpiece, but which is movable transversely relative thereto, and which carries a thread cutting attachment including a tool slide movable parallel to the axis of the spindle by a drive mechanism driven from the spindle and which drive mechanism is connected for operation upon movement of the cross slide toward the spindle axis and into threading position.

A still further object of the present invention is the provision of a new and improved machine tool, as noted in the next preceding object, wherein a clutch mechanism having an input and an output member is energized upon movement of the cross slide into threading position, and wherein the input member of the clutch is drivingly connected with the spindle and the output member of the clutch is drivingly connected with a lead screw which cooperates with a nut for moving a longitudinal slide parallel to the axis of rotation of the workpiece, and wherein the longitudinaly slide carries the tool slide for movement therewith.

Still another object of the present invention is the provision of a new and improved threading attachment for a machine tool wherein a tool slide is supported on a longitudinal slide which is moved in work and return strokes by a lead screw and wherein mechanism is provided for reversing the direction of rotation of the lead screw for reversing the direction of movement of the longitudinal slide, and wherein means is provided for moving the tool slide relative to the longitudinal slide away from and toward the axis of rotation of the workpiece in withdrawal and infeed strokes, and wherein the reversing mechanism for the lead screw includes a fluid motor which is energized in response to withdrawal movement of the tool slide to effect a reversal in the direction of rotation of the lead screw.

Yet another object of the present invention is the provision of a new and improved threading attachment for a machine tool wherein a tool slide is supported on a longitudinal slide which is moved parallel to the axis of rotation of the workpiece and in work and return strokes by a lead screw and nut mechanism and the tool slide is movable in withdrawal and infeed strokes relative to the longitudinal slide and wherein the infeed movement of the tool slide energizes a fluid motor for reversing the direction of rotation of the lead screw so as to effect forward movement of the tool slide in a cutting stroke parallel to the axis of the workpiece.

A further object of the present invention is the provision of a new and improved threading attachment for a machine tool, as noted in the next preceding object, wherein as the tool slide starts forward in its work pass, a fluid motor for moving the tool slide in the withdrawal stroke is changed to bias the tool slide away from the axis of rotation of the workpiece.

Still a further object of the present invention is the provision of a new and improved mechanism for effecting withdrawal movement of a tool slide away from the workpiece and which includes a release member which blocks withdrawal movement of the tool slide and which engages a fixed stop at the end of the work stroke of the tool slide and releases the tool slide for withdrawal movement after engagement with the stop and wherein the withdrawal movement is effected by a fluid motor which biases the tool slide away from the workpiece during cutting and provides for an extremely quick withdrawal movement of the tool sldie.

Another object of the present invention is the provision of a new and improved indexing mechanism for positioning a thread cutting tool and which includes an infeed cam which is indexible to determine the innermost position for the cutter of the toolholder and thereby determines the depth of cut and which is indexible after each work pass so as to effect a deeper depth cut on the next work pass, and wherein a valve is actuated when the proper depth cut has been effected and controls the return of the indexing cam to its initial position and discontinuation of the threading cycle.

Further objects and advantages of the present invention will be apparent to those skilled in the art to which it relates from the following detailed description of a preferred embodiment thereof made with reference to the accompanying drawings forming a part of this specification and in which.

The present invention provides a new and improved apparatus for cutting threads in a workpiece, and particularly provides a new and improved threading attachment for a machine tool. The present invention provides a so-called single point threading mechanism which embodies a cutter for engaging a rotating workpiece to cut a thread in the rotating workpiece. The cutter is moved in a work stroke substantially parallel to the axis of the workpiece to effect cutting of the thread in the workpiece. At the end of the work stroke, the cutter is withdrawn from the workpiece and is then moved in a return stroke substantially parallel to the axis of rotation of the workpiece. At the end of the stroke, the cutter is again moved toward the work in an infeed stroke and into a position to be moved again in a work pass. The cutter is moved into a position so as to cut a deeper thread in the workpiece on the second work stroke. The cutter is continuously moved in a threading cycle of work, withdrawal, return, and infeed strokes, until the desired depth thread is cut in the workpiece, at which time the threading operation is concluded.

Figure 1:
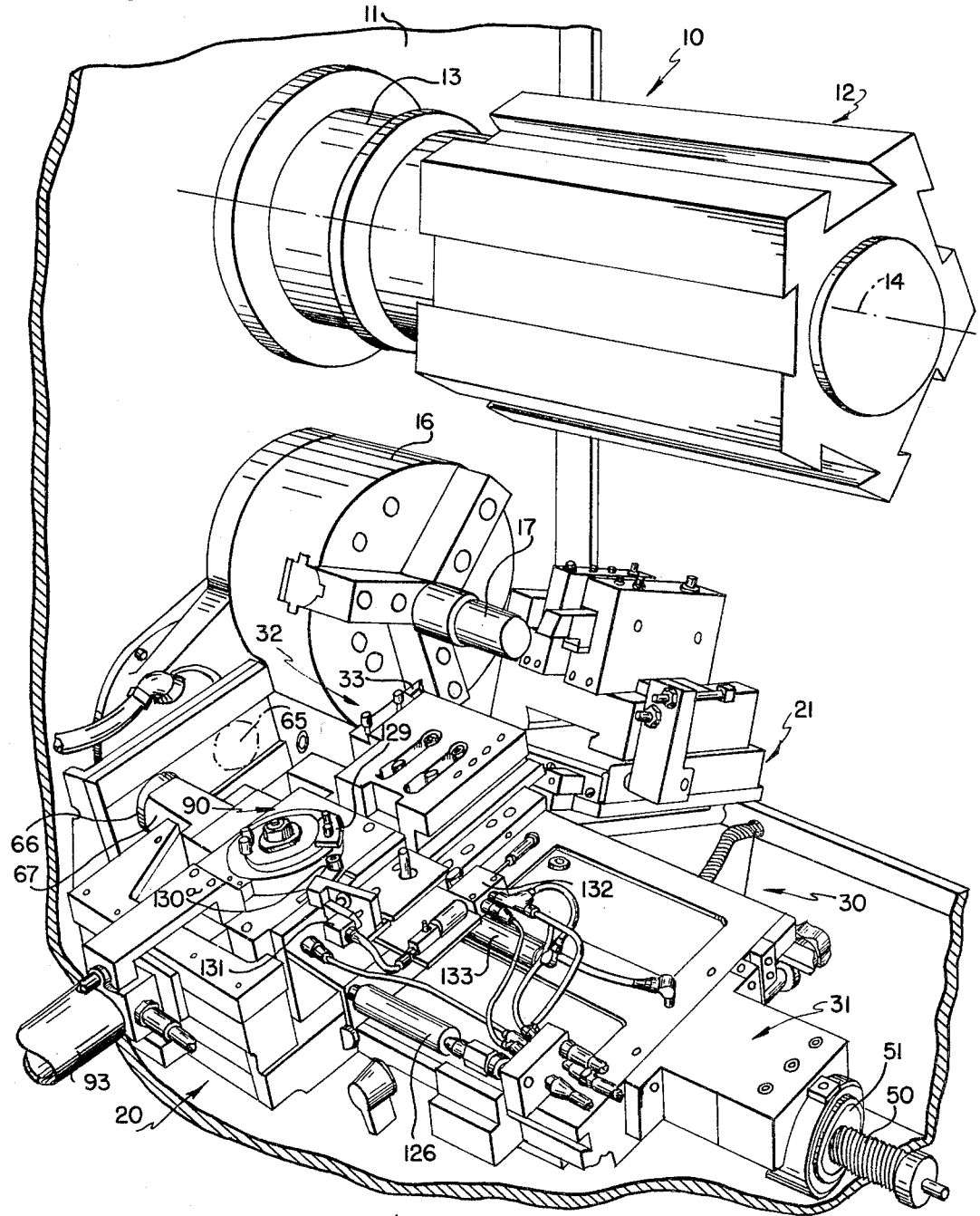
FIG. 1 is a perspective view with parts omitted illustrating a machine tool embodying the present invention.

As representing a preferred embodiment of the present invention, FIG. 1 illustrates a machine tool 10. The machine tool 10 includes a suitable support 11 and a turret 12. The turret 12 is carried on the end of a turret bar 13 which is supported by the support 11. The bar 13 is rotatable about an axis generally designated 14. The turret 12 has a plurality of tool supporting surfaces or portions therearound and when the bar is rotated about the axis 14, the various surfaces of the turret are moved into a machining position. The bar 13 is also movable longitudinally along the axis 14 so as to bring the various tools on the turret into machining position and for effecting machining with the tools.

The turret 12 is mounted above a rotatable spindle 15 and the axis 14 of the turret is parallel to the axis of rotation of the spindle 15. The spindle 15 includes a suitable chuck mechanism 16 which engages and supports a workpiece 17, shown in FIG. 1 in position in the chuck, and which is rotatable on rotation of the spindle and chuck. The workpiece 17 rotates about an axis parallel to the axis 14 of the turret.

The machine tool 10 also includes front and rear cross slides 20, 21, respectively. The front and rear cross slides are suitably supported by the base of the machine and are fixed, as is well known, against any longitudinal movement relative to the workpiece. The cross slides 20, 21, however, are movable transversely toward and away from the rotating workpiece 17 by suitable mechanism which does not form a part of the present invention and will not be described in detail. The machine tool 10 incorporates suitable electrical controls for effecting automatic machining operations on the workpiece 17, as desired.

The mechanisms for effecting the movement of the cross slides 20, 21, the rotation of the turret, as well as longitudinal movement of the turret, and the automatic operation thereof are shown in United States Patent No. 2,644,222, and reference may be made thereto for purposes of details of the structure, electrical controls, and operation of the machine tool 10. These details will not be described herein in detail, since they are already disclosed in the aforesaid United States patent.

In accordance with the present invention, a threading attachment, generally designated 30, is supported on the front cross slide 20 of the machine tool 10 and which is movable with the cross slide 20. The threading attachment 30, in general, includes a longitudinal slide 31. The longitudinal slide is movable in a direction parallel to the axis of rotation of the spindle 17. The longitudinal slide 31 carries a tool slide 32 which is movable relative to the longitudinal slide in a direction transverse to the axis of rotation of the workpiece 17 toward and away from the axis of rotation of the workpiece. The tool slide 32 carries a cutter 33 which is movable therewith and which engages the workpiece to effect cutting thereof.

The operation of the threading attachment 30 is effected after movement of the cross slide 20 inwardly toward the axis of the workpiece. The movement of the cross slide 20 is actuated automatically in the operation of the machine tool 10, as will be apparent after a consideration of the afore-mentioned United States patent. The inward movement of the cross slide positions the threading attachment for effecting threading of the workpiece.

The threading attachment includes means 40 for moving the longitudinal slide 31 parallel to the axis of rotation of the workpiece in a work and a return stroke. The threading attachment also includes mechanism, generally designated 41, for effecting movement of the tool slide 32 relative to longitudinal slide 31 so as to effect withdrawal of the tool 33 from the workpiece and movement of the tool 33 toward the workpiece.

Figure 3:
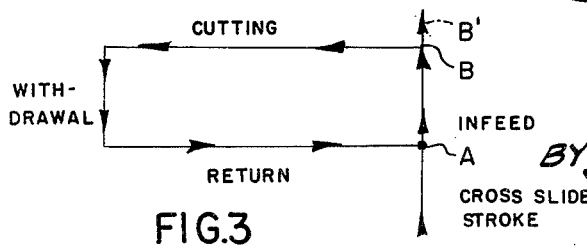
FIG. 3 is a schematic view illustrating the path of movement of a cutting tool used in the machine tool shown in FIG. 1.

The movement of the cutting tool 33 through a threading cycle will be readily understood upon consideration of FIG. 3. Referring to FIG. 3, the movement of the threading attachment to bring the cutting tool into threading position and which is effected by the cross slide is labelled as such in FIG. 3. This movement brings the cutting tool to a position designated A. The infeed movement of the tool slide 32 relative to the longitudinal slide 31 is then effected to bring the cutting tool into position B. The longitudinal slide 31 is then moved to effect movement of the cutter 33 in the work stroke. At the end of the work stroke, the tool slide 32 is moved relative to the longitudinal slide 31 in a withdrawal stroke and then the longitudinal slide is moved to effect movment of the tool slide in the return stroke bringing the tool back to point A. The tool slide 32 is then again moved in an infeed direction causing the tool 33 to move from the point A to a point B' inwardly of the point B so as to effect a deeper cutting of the threads in the workpiece on the next work stroke of the cutter.

The drive mechanism 40 which effects movement of the longitudinal slide in the work and return strokes comprises a lead screw 50 and a cooperating nut 51. The nut 51 is secured to the longitudinal slide in a suitable manner and cooperates with the lead screws 50. Rotation of the lead screw 50 effects movement of the nut 51 along the lead screw and thus effects movement of the longitudinal slide. The nut 51 and lead screw 50 may be readily replaced depending upon the thread to be cut.

The lead screw 50 is driven from the spindle 15 of the machine tool 10 and in timed relation therewith by a drive mechanism which includes a gear 60 connected with and rotatable with the spindle 15. A gear 62 meshes with the gear 60. A pinion gear 63 rotates with the gear 62 and, in turn, meshes with a gear 64. The gear 64 is connected to an input member 65 of a magnetic clutch. An output member 66 of the magnetic clutch is carried by the cross slide 20 and is moved into position adjacent the input member of the clutch 65 when the cross slide 20 is in threading position and the magnetic clutch is energized automatically in response to movement of the cross slide into position. This circuit for effecting this energization has not been shown since any conventional circuit may be used. The output member 66 of the clutch is driven in timed relation to the rotation of the spindle through the gears 60–64 and the input member 65 of the clutch. The output member 66 is drivingly connected to a shaft 67 which is drivingly connected with a drive transmission mechanism 68 which, in turn, is drivingly connected with the lead screw 50 and effects rotation of the lead screw 50.

The drive transmission mechanism 68 transmits the drive from the shaft 67 to the lead screw 50 and effects rotation of the lead screw 50 in either a forward or reverse direction. When the lead screw 50 is driven in a forward direction, the drive is transmitted from a gear 70 connected to shaft 67 through a clutch member 72 drivingly connected to the lead screw 50 so as to effect rotation of the lead screw 50 in a forward direction. Whereas, when the lead screw 50 is to be rotated in a reverse direction, the clutch 72 is shifted so as to be drivingly connected to gear 71 and the drive is transmitted from gear 70 through gearing 70a, gear 71, and clutch member 72 to the lead screw 50. The clutch member 72, which is shiftable between forward and reverse positions so as to effect forward or reverse rotation of the lead screw 50, is shown in full lines in FIG. 2 as in its position for effecting rotation of the lead screw 50 in a forward direction.

The clutch member 72 is connected to a link member 73 and is moved between forward and reverse positions upon movement of the link 73. The link 73 is moved between its positions by a fluid motor 80. The fluid motor 80 includes a piston 81 and a piston rod 82. The piston rod 82 is connected to the link 73 and effects pivoting movement of the link 73 so as to effect movement of the clutch member 72 between the forward and reverse positions. Energization of the motor 80, of course, will effect movement of the clutch member 72 between the forward and reverse positions, depending upon the direction of movement of the piston rod 82. When the lead screw 50 is rotated through clutch 72 in a forward direction, the longitudinal slide 31 is moved in a direction parallel to the direction of rotation of the workpiece in the cutting stroke. Whereas, when the lead screw is rotated in the reverse direction, the longitudinal slide 31 is moved in the opposite direction so as to move the longitudinal slide 31 parallel to the direction of rotation of the workpiece in the return stroke.

As noted hereinabove, the tool slide 32 is movable relative to the longitudinal slide 31 toward and away from the axis of the workpiece in order to effect movement of the cutter 33 toward and away from the workpiece. More specifically, the tool slide 32 is mounted on ways carried by the longitudinal slide 31 and is movable relative to the longitudinal slide 31 toward and away from the axis of rotation of the workpiece. The tool slide 32 is moved in the infeed stroke prior to the cutting stroke, and the tool slide 32 is moved in the withdrawal stroke after the cutting stroke. The amount of infeed movement of the tool slide 32 inwardly toward the workpiece prior to movement of the tool 33 in the cutting stroke is controlled by a suitable depth of cut mechanism, designated 90.

The mechanism 90 includes an infeed cam 91 which is connected with and carried by the tool slide. A cam follower 92 is carried by the tool slide and engages the cam 91. The cam 91 and cam follower 92 are relatively movable and held in engagement during the cutting stroke by a suitable fluid motor 93 which is connected with the tool slide and biases the tool slide outwardly during the cutting stroke. The rotational position of the cam 91 determines the inward position of the cutter 33 and thus determines the depth of cut. The cam 91 is indexible at the end of each return stroke in order to provide for a greater amount of inward movement of the tool 33, as will be described in detail hereinbelow.

As the fluid motor 93 holds the cam 91 in engagement with the cam follower 92, the lead screw 50 is rotated to effect forward movement of the tool 33 along the axis of rotation of the workpiece to effect a cutting of the thread in the workpiece. During the cutting stroke, the tool slide 32 is prevented from moving away from the axis of the workpiece by an abutment 103 on the longitudinal slide 31. The abutment 103 engages a surface 101a of a rod or release key 101 which is carried by the tool slide 32, and specifically is carried by a linkage, schematically designated in FIG. 2 as 104, and which carries the cam follower 92. Thus, during cutting, the cam 91 is biased outwardly by motor 93 against cam follower 92, but the cam follower 92 is held from outward movement by abutment 103.

At the end of the cutting stroke, the cam follower 92 is permitted to move away from the axis of the workpiece. To this end, an adjustable stop 100 is provided which determines the end of the cutting stroke. The stop 100 engages the release key or rod 101 carried by the tool slide 32 at the end of the work stroke. On continued movement of the longitudinal slide 31 after the rod 101 engages the stop 100, the longitudinal slide 31 moves relative to the rod 101 which is prevented from moving due to engagement with the stop 100. The rod 101 has a slot 102 therein which aligns with the abutment or block 103 carried by the longitudinal slide. When this occurs, the tool slide 32 is released for withdrawal movement and the tool slide and the rod 101 carried by the tool slide 32 are snapped or moved rapidly in the direction of the arrow 105, shown in FIG. 2, by the fluid motor 93. The amount of movement is limited by the bottom surface 102a of the slot 102 engaging the abutment 103.

The threading attachment includes means for reversing the direction of rotation of the lead screw in response to the withdrawal movement of the tool slide 31. Specifically, when the release key or rod 101 is moved outwardly in the direction of the arrow 105, it actuates a valve 120 which controls operation of the fluid motor 80 which, in turn, reverses the transmission mechanism 68, thereby reversing the direction of rotation of the lead screw 50. Thus, the direction of the lead screw is reversed and the longitudinal slide 31 moves in the return stroke.

The infeed movement of the tool slide 32 and the depth of cut is controlled in response to the longitudinal slide 31 reaching the end of the return stroke. When the longitudinal slide 31 reaches the end of its return stroke, an adjustable trip 121 movable with the slide 31 engages an actuating member 122 which, in turn, actuates a valve 123. The valve 123 controls a pilot mechanism 124 for a distributing valve 125.' The distributing valve when actuated thereby directs fluid to the fluid motor 93 causing the fluid motor to apply a force to the tool slide 32 moving the tool slide 32 toward the axis of rotation of the workpiece. As the tool slide 32 moves toward the axis of rotation of the workpiece, the release key or rod 101 moves relative to abutment 103 toward the workpiece and out of engagement with the valve actuating member 120a. When this occurs, the fluid motor 80 is actuated to reverse the direction of rotation of the lead screw causing the longitudinal slide 31 to again move in the cutting stroke.

The movement of the release key or rod 101 relative to the abutment 103 is sufficient to remove the abutment 103 from slot 102 in the release key. A spring 101b then biases the release key 101 so that the outer surface 101a thereof is positioned to engage the abutment 103. Thus, when the motor 93 is actuated to bias the tool slide 32 outwardly, outward movement is prevented until the slot 102 and abutment 103 become aligned, as described above.

The distributing valve 125 when actuated by trip 121 also directs fluid to the mechanism 90 for controlling the depth of cut. Specifically, a fluid motor 126 is energized. The fluid motor 126 when energized effects movement of a pawl 127 which is pivotally carried on the outer end of the piston rod of the fluid motor and is biased into engagement with a ratchet wheel 128 by a suitable spring 128a. When the motor 126 is not energized, the pawl 127 is held away from the ratchet wheel 128 by a stop pin 127a, but when fluid pressure is directed to motor 126, the pawl 127 moves relative to the stop 127a and spring 128a causes the pawl to pivot into and engage the teeth of the ratchet wheel 128. A suitable locking pawl 129a is provided for holding the ratchet wheel 128 in the position to which it is rotated and which is releasable to permit return of the ratchet whel, as will be described hereinbelow.

The ratchet wheel 128 is connected through a suitable drive mechanism including a torsion or clock spring 91a to the cam 91, and effects rotation thereof. Any well-known drive interconnection may be used and such a drive will not be described herein. Rotation of the cam 91 brings a larger diameter point into engagement with the cam follower 92. Since the cam follower 92 cannot move away from the axis of the workpiece due to the position of the release key 101 relative to the abutment 103, the rotation of the cam 91 causes a forward movement of the tool slide 32 relative to the longitudinal slide 31. This movement also increases the distance between the cam follower 92 and the cutter 33. As noted above, the valve 125 actuates motor 93 to move the tool slide inwardly. However, in view of the rotation of the cam 91, the inner position of the cutter 33 will be inwardly of the previous position thereof. Thus, a deeper depth thread can be cut in the workpiece on the next cutting stroke.

The threading cycle continues automatically without operator intervention until the workpiece is threaded. When the threading cycle is completed, indexing of the ratchet wheel 128 causes an adjustable trip member, which is positioned thereon and designated 129, to engage a trip 130 for a valve 131. The valve 131 controls a valve 132 by effecting energization of a pilot mechanism 133a for the valve 132. When the pilot mechanism 133a is energized, the valve 132 is actuated to direct fluid to a fluid motor 133. The outer end of the piston rod 133b of the motor 133 engages a part of pawl 129a and pivots the pawl 129a against the spring 129b so that the pawl 129a disengages from the teeth of the ratchet wheel 128. This releases the ratchet wheel 128 and permits the aforementioned clock spring 91a to return the ratchet wheel 128 and cam 91 to their initial positions. At the same time, pressure switch 134 is energized which, in turn, controls contacts in the main circuits of the machine to withdraw the cross slide 20 and causes the machine to operate to effect the next work operation on the workpiece, as desired.

The threading attachment also includes a multi-start clutch 140 which may be actuated to provide threads on the workpiece with different starting positions. The clutch 140 is of conventional construction and is in the drive to the lead screw 50. The clutch is actuated, if desired, by a mechanical arrangement 141 triggered by a trip 142 carried by the longitudinal slide. In view of this known threading technique and the conventional nature of the clutch 140, a detailed description thereof will not be made.

From the above description, the operation of the threading attachment of the present invention should be apparent. However, the operation will be clearer upon reference to FIG. 2 which shows the fluid conduits which interconnect the various valve members and which are to be described hereinbelow in connection with a description of a threading operation.

As noted above, the threading operation is actuated by the main circuits of the automatic machine tool 10 being energized to effect movement of the cross slide 20 into threading position. When this occurs, the movement of the turret 10 is interrupted so that it is rendered inoperative until the threading operation is completed. The spindle rotation is also momentarily stopped. When the cross slide reaches the threading position, clutch parts 65, 66 are drivingly connected and the spindle rotation is also actuated.

Figure 2:
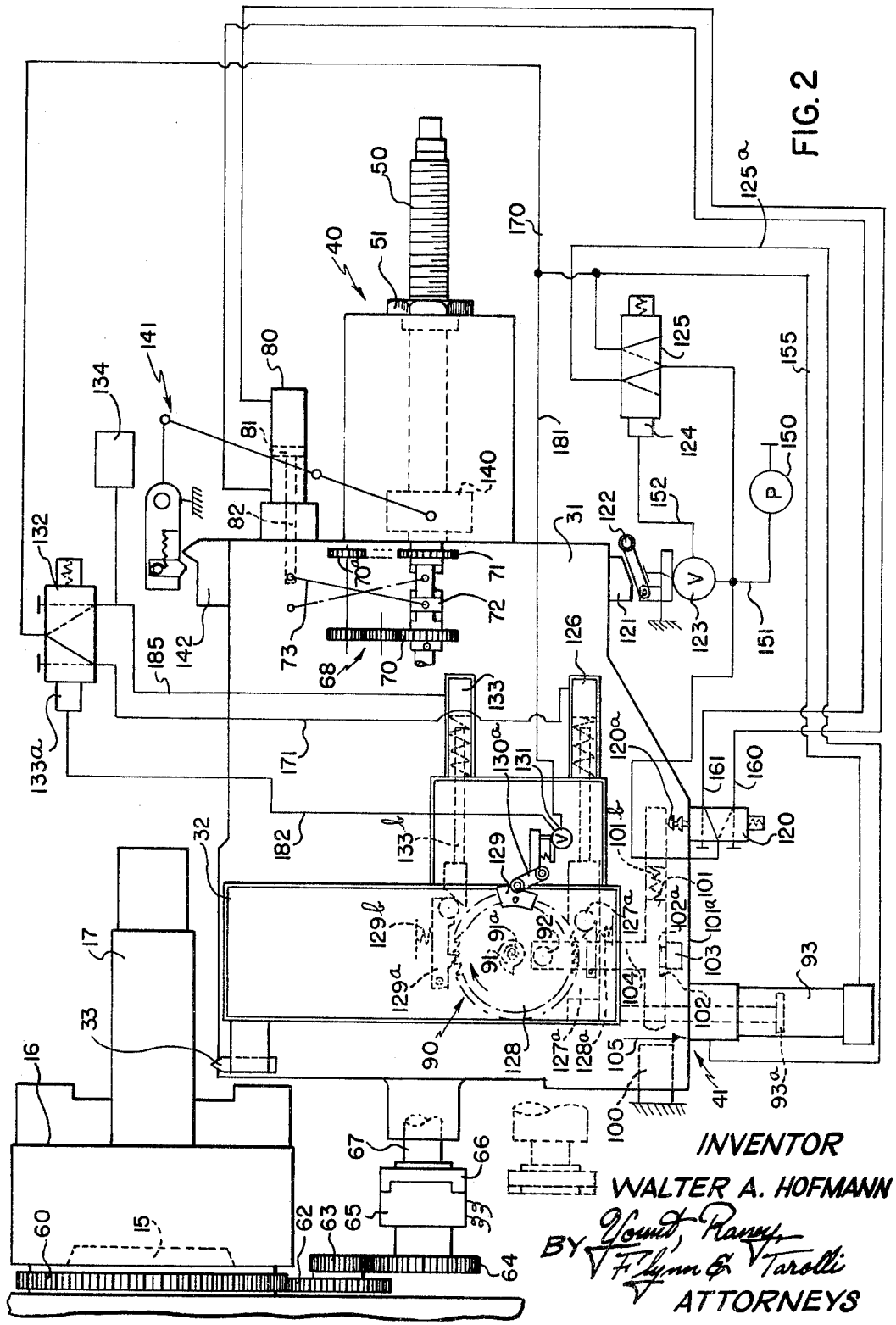
FIG. 2 is a schematic diagram showing parts of the machine tool of FIG. 1.

During the threading operation with the tool slide at point A, the parts are in the condition wherein a fluid pump 150 is delivering fluid through the line 151 to the valve 123 which, in turn, is directing fluid through the line 152 to the pilot mechanism 124 causing the valve 125 to be in the dotted line position shown in FIG. 2. When the valve is in the dotted line position shown in FIG. 2, fluid is directed from the line 151 through the valve 125 and through the line 155 to the lower end of the cylinder 93 beneath the piston 93a therein, as viewed in FIG. 2. This, of course, causes the motor 93 to effect movement of the tool slide 32 inwardly. At this time, fluid pressure is also directed from conduit 151 through valve 120, and conduit 160 to motor 80 holding motor 80 in its reverse position.

Inward movement of the tool slide 32 causes the rod 101 to move relative to the actuating member 120a of the valve 120 and causes the valve 120 to move from the dotted position to the full line position shown in FIG. 2. When valve 120 is in its full line position, fluid is directed from the line 151 through conduit 161 to the left side of the piston 81 of the motor 80. This causes the piston 81 to move to the right, as viewed in FIG. 2, and causes the link 73 to move the clutch member 72 so as to effect rotation of the lead screw 50 in a forward direction. In this manner, the lead screw 50 is rotated in a forward direction through the clutch elements 65, 66 from the spindle, and effects movement of the longitudinal slide 31, and the cutter 33 effects cutting of the workpiece as the longitudinal slide 31 moves.

When the longitudinal slide 31 moves forward, trip 121 moves away from actuating member 122. This causes a de-energization of the pilot mechanism 124 and the valve 125 returns to its full line position shown in FIG. 2 in which fluid is directed through fluid conduit 125a to the upper end of the motor 93, as viewed in FIG. 2. This charges the fluid motor 93 and biases the tool slide outwardly from the workpiece. No movement of the tool slide occurs, however, due to the relative position of the release key 101 and abutment 103, which is effected when the tool slide 32 is moved inwardly by motor 93.

When the longitudinal slide 31 reaches the end of the forward or cutting stroke, as determined by the adjustable stop 100, the release key or rod 101 engages the stop 100 and is prevented from further movement due to this engagement. Continued movement of the longitudinal slide 31 brings the abutment 103 into alignment with the recess 102 in the release key 101. Due to the fact that the cylinder 93 has at this time a pressure in the upper end thereof, as viewed in FIG. 2, the tool slide 32 is moved rapidly in a snap action by the cylinder 93 in a direction away from the axis of rotation of the workpiece. This movement of the tool slide and the latch key 101 away from the axis of rotation of the workpiece causes the latch key 101 to move actuating member 120a of the valve 120 and causes actuation of the valve 120 from the condition shown in full lines in FIG. 2 to the condition indicated by dotted lines in FIG. 2. This causes fluid to be directed to the right side of the motor 80 through conduit 160, and the left side of the motor 80 will be connected directly through conduit 161 to a low pressure relief area. This causes actuation of the cylinder 80 to effect movement of the clutch member 72 from its forward position to its reverse position. This, of course, reverses the direction of rotation of the lead screw 50, and the longitudinal slide 31 is thus moved in the return stroke in a direction opposite the direction of its movement in the work stroke.

The adjustable trip 121 engages the actuating member 122 at the end of the return stroke, as determined by the adjustment of the trip 121. When the adjustable trip 121 engages the actuating member 122, it causes actuation of the valve 123 which directs fluid from the pump 150, through the valve 123, and the conduit 152 to the pilot mechanism 124 for the valve 125. When fluid is directed to the pilot mechanism 124, the valve 125 is energized from the full line condition, shown in FIG. 2, to the dotted line condition shown in FIG. 2.

When the valve 125 is energized to its dotted line condition, fluid is directed through the conduit 155 to the bottom of the cylinder 93 to effect movement of the tool slide 32 inwardly relative to the longitudinal slide with the cam follower 92 engaging the periphery of the cam 91. Fluid is also directed from motor 93 through conduit 125a and valve 125 to a low pressure area. Also, when the valve 125 is energized to the dotted line condition shown in FIG. 2, fluid is directed from the pump 150 through conduit 151, valve 125, a conduit 170, the valve 132 which is in its condition shown by full lines at this time, and conduit 171 to the indexing cylinder 126 which effects an indexing of the ratchet wheel 128 and thereby a rotation of the cam 91. Energization of valve 125, as described above, positions the cutter 33 so as to cut a deeper thread in the workpiece 17 and energizes motor 93 to move the tool slide 32 inwardly.

When the tool slide moves inwardly toward the axis of the workpiece, the release key 101 is moved in a direction opposite the direction of the arrow 105, and causes the valve actuating member 120a to move upwardly, as viewed in FIG. 2. This causes the valve 120 to return to the full line position shown in FIG. 2. When the valve 120 returns to the full line position shown in FIG. 2, fluid is directed through the conduit 161 to the left side of the motor 80 and the right side of the motor 80 is connected with a low pressure area. This causes movement of the piston rod 82 thereof toward the right as viewed in FIG. 2, and causes the clutch member 72 to be moved to its forward position to effect rotation of the lead screw 50 in a forward direction. Rotation of the lead screw in a forward direction, of course, starts movement of the longitudinal slide 31 in the cutting stroke.

As the longitudinal slide 31 moves in the work pass, the adjustable trip 121 moves out of contact with the trip mechanism 122, causing the valve 123 to be de-energized. When the valve 123 is de-energized, the pilot mechanism 124 for the valve 125 is likewise de-energized and the valve 125 is then returned to the full line condition shown in FIG. 2 from the dotted line condition shown in FIG. 2. When the valve 125 is returned to the full line condition shown in FIG. 2, fluid is directed from the pump 150 through the supply conduit 151 and conduit 125a, to the upper side of the cylinder 93, as viewed in FIG. 2. This, of course, applies the biasing force on the tool slide 32 tending to move the tool slide away from the axis of rotation of the workpiece, as described above. Of course, the tool slide cannot move away from the axis of rotation of the workpiece because of the surface of the release key 101 which engages the stop member 103, at this time. At the end of the work pass, the release key recess 102 again aligns with the member 103 causing withdrawal of the tool slide 32 away from the workpiece.

The above operations are continuously repeated until the final workpass which is determined by the position of the adjustable trip 129. The adjustable trip 129 is positioned so as to engage an actuating mechanism 130a for the valve 131. When the trip member 129 engages the actuating member 130a for the valve 131, the threading operation is stopped. This occurs when the ratchet wheel 128 is rotated, and the ratchet wheel 128 is rotated when the longitudinal slide is moved in its return direction and reaches the end of its return stroke, as described above. At this point, the valve 125, as described hereinabove, is energized to its dotted line condition. Fluid is then directed from the valve 125 through the conduit 181 to valve 131 which is moved to an open position due to the trip 129 engaging the actuating mechanism 130a for the valve 131. When the valve 131 is moved to its open position, fluid is directed through the valve 131, a fluid conduit 182, to the pilot mechanism 133a for the valve 132. When the pilot mechanism 133a is energized, the valve 132 is moved from the condition shown in full lines in FIG. 2 to the condition shown in dotted lines in FIG. 2. When in the condition shown in dotted lines in FIG. 2, the valve 132 directs fluid from the conduit 170 to a fluid conduit 185. The conduit 185, is connected with the release cylinder 133 described hereinabove which effects a release of the latching mechanism for the infeed cam 91 and permits a return of the cam to its original position. At the same time, the fluid pressure switch 134 is energized due to its connection with the conduit 185 and in response to the energization of the pressure switch 134, the main control circuits of the machine tool 10 are energized to move cross slide 20 outwardly of the workpiece to move the threading attachment for threading position, and effect the next machining operation on the workpiece. Outward movement of the cross slide would occur after a declutching of the clutch parts 65, 66.

It should be noted that upon withdrawal of the cross slide 20, the cylinder 80 is in its forward condition so as to cause the lead screw 50 to be in its forward condition and the cylinder 93 is in a condition having fluid in the lower portion thereof so that upon the next threading operation, movement of the cross slide 20 into position will automatically cause the operation of the threading attachment to begin, as described hereinabove.

The fluid pressure system described hereinabove is preferably an air system. However, it could be a hydraulic system equally as well, so far as the operation thereof is concerned.

It should be apparent that the present invention has been described hereinabove in considerable detail and that certain modifications, changes, and adaptations may be made therein by those skilled in the art to which it relates and it is hereby intended to cover all such modifications, changes, and adaptations which come within the scope of the appended claims.

Having described my invention, I claim:

1. An apparatus for threading a workpiece comprising a rotatable spindle for supporting and effecting rotation of a workpiece, a cross slide adjacent the spindle and supported for movement toward and away from the axis of rotation of the workpiece, a threading attachment mounted on the cross slide, said threading attachment including a longitudinal slide movable parallel to the axis of rotation of the workpiece in a work stroke and a return stroke, drive mechanism for effecting movement of the longitudinal slide in said work and return strokes, said drive mechanism including a clutch having an input member drivingly connected with the spindle and an output member movable with said cross slide, and said output clutch member being movable into position adjacent the input clutch member upon movement of the cross slide into threading position and said clutch being energized when said output member is in operative position adjacent the input member to effect movement of the longitudinal slide in timed relation to the rotation of the spindle.

2. An apparatus as defined in claim 1 further including a lead screw member and a cooperating nut member, one of said members being drivingly connected with the output member of said clutch and rotatable to effect movement of said longitudinal slide, a reversible drive mechanism interconnecting said one member and the output member of the clutch so as to effect rotation of said one member in opposite directions upon actuation thereof to thereby effect movement of said longitudinal slide in opposite directions.

3. An apparatus as defined in claim 2 wherein said reversible mechanism comprises a fluid motor energizable to effect either forward or reverse rotation of the lead screw.

4. An apparatus as defined in claim 3 further including a tool slide supported for movement toward and away from the axis of the workpiece by said longitudinal slide, said tool slide supporting a cutting tool for engagement with the workpiece, means for moving the tool slide relative to the longitudinal slide away from the workpiece at the end of the work stroke of the longitudinal slide, and means responsive to movement of the tool slide away from the workpiece at the end of the work stroke of the longitudinal slide to effect energization of said fluid motor to actuate said reversible drive mechanism and effect a reversal of the direction of rotation of said one member so as to thereby move the longitudinal slide in a return direction.

5. An apparatus for threading a rotating workpiece comprising a longitudinal slide movable in opposite directions in work and return strokes, a tool slide movable relative to said longitudinal slide toward the axis of rotation of the workpiece into threading position and movable relative to the longitudinal slide away from the axis of rotation of the workpiece out of threading position, a lead screw and nut mechanism operable to effect movement of the longitudinal slide in said work and return strokes including a nut member carried by the longitudinal slide and a cooperating lead screw rotatable to effect movement of said nut member therealong, a reversing mechanism actuatable to reverse the direction of rotation of the lead screw in order to cause the lead screw to rotate in a first direction to effect movement of the longitudinal slide in said work stroke and effect rotation of the lead screw in a second direction opposite the first direction to effect movement of the longitudinal slide and in said return stroke, a fluid motor energizable to actuate said reversing drive mechanism, means for moving the tool slide in a direction away from the workpiece when the longitudinal slide reaches the end of said work stroke, and means responsive to withdrawing movement of the tool slide to energize said fluid motor and actuate said reversing drive mechanism to reverse the direction of the lead screw to move said longitudinal slide in said return stroke.

6. An apparatus as defined in claim 5 wherein said means for moving the tool slide away from the workpiece comprises another fluid motor which biases the tool slide away from the workpiece during the work stroke, and means for blocking movement of said tool slide away from the workpiece during the work stroke and releasable at end of the work stroke to permit said another fluid motor to move said tool slide away from the workpiece.

7. An apparatus as defined in claim 6 wherein said means for blocking movement of said tool slide is reset in response to inward movement of said tool slide toward said workpiece.

8. An apparatus as defined in claim 6 further including means for energizing said another fluid motor to effect movement of said tool slide toward said workpiece at the end of said return stroke.

9. An apparatus as defined in claim 8 further including means for charging said another fluid motor to bias said tool slide outwardly in response to initial movement of said longitudinal slide in said work stroke.

10. An apparatus for threading a workpiece comprising a longitudinal slide movable in a work stroke and a return stroke, means for effecting movement of the longitudinal slide in said work and return strokes, a tool slide carried by the longitudinal slide and movable relative to the longitudinal slide toward and away from the axis of rotation of the workpiece, a fluid motor for effecting movement of the tool slide toward and away from the workpiece, means for loading said motor to urge said tool slide away from said workpiece during said work stroke, means for blocking movement of said tool slide relative to the longitudinal slide during said work stroke and releasable when said longitudinal slide reaches the end of said work stroke, said last means including an abutment member engageable with a part of a release member during said work stroke and blocking movement of the tool slide by said motor, a stop member engageable with said release member at the end of said work stroke to prevent further movement of said release member with said longitudinal slide and provide for relative of said release member and said abutment releasing said tool slide for outward movement by said fluid motor.

11. An apparatus as defined in claim 10 wherein said release member moves outwardly with said tool slide when in its release position, and further including means responsive to outward movement of said release member for actuating the return movement of said longitudinal slide.

12. An apparatus as defined in claim 11 wherein said release member is repositioned in blocking position relative to said abutment upon inward movement of said tool slide toward said workpiece.

13. An apparatus for threading a rotating workpiece comprising a longitudinal slide movable in work and return strokes parallel to the direction of rotation of the workpiece, a tool slide movable toward the axis of rotation of the workpiece prior to the beginning of the work stroke and movable away from the axis of rotation of the workpiece at the end of the work stroke, a fluid motor for effecting movement of the tool slide toward and away from the axis of rotation of the workpiece, means for charging said fluid motor to bias said tool slide away from the axis of rotation of the workpiece during the work stroke, and means for energizing said fluid motor to effect movement of the tool slide toward the axis of rotation of the workpiece in response to the longitudinal slide reaching the end of the return stroke thereof.

14. An apparatus as defined in claim 13 further including an actuating mechanism energizable by a trip member carried by said longitudinal slide and a valve member energized by said actuating mechanism for controlling the direction in which fluid is applied to said fluid motor.

15. An apparatus as defined in claim 14 wherein said valve energizes said fluid motor to effect movement of the tool slide inwardly at the end of the return stroke of the longitudinal slide and is effective at the beginning of the work stroke of the longitudinal slide to apply a fluid force to said fluid motor to bias the tool slide away from the direction of rotation of the workpiece.

16. An apparatus as defined in claim 15 including a ratchet mechanism energizable to vary the position of a cutter carried by the tool slide to increase the depth of cut on each successive work stroke.

17. An apparatus as defined in claim 16 wherein said ratchet mechanism includes another fluid motor energizable when said valve means is energized at the end of the return stroke of the longitudinal slide.

18. An apparatus for threading a rotating workpiece comprising a longitudinal slide movable in work and return strokes to effect cutting of a workpiece, a tool slide carried by said longitudinal slide and movable relative thereto toward and away from the axis of rotation of said workpiece, a mechanism for varying the depth of cut on each successive work stroke of said longitudinal slide, said mechanism including an infeed cam, a ratchet wheel rotatable to effect rotation of said cam prior to a work stroke, a fluid motor for rotating said ratchet wheel, a locking pawl for holding said ratchet wheel in the position to which it is rotated, and another fluid motor for releasing said locking pawl to permit return of said ratchet wheel at the end of the threading operation.

19. An apparatus as defined in claim 18 wherein said another fluid motor is energized by a trip member movable with said ratchet wheel which actuates a valve member to deliver fluid preserve to said fluid motor.

20. An apparatus as defined in claim 19 wherein said longitudinal slide is mounted on a cross slide movable toward the axis of rotation of the workpiece into threading position and further including a switch energized upon actuation of said valve member for triggering movement of said cross slide away from the axis of rotation of said workpiece.

References Cited

UNITED STATES PATENTS

| | | | |
|---|---|---|---|
| 2,712,140 | 7/1955 | Curtis | 82—5 X |
| 2,920,332 | 1/1960 | Helmke | 82—5 |
| 3,041,640 | 7/1962 | Renoux | 82—5 X |
| 3,121,357 | 2/1964 | Skoglund | 82—5 |
| 3,174,367 | 3/1965 | Lukens | 82—5 |
| 3,190,157 | 6/1965 | Ciccarelli | 82—5 |
| 3,192,806 | 7/1965 | Bissee | 82—5 |
| 3,363,491 | 1/1968 | George | 82—5 |

HARRISON L. HINSON, Primary Examiner

PO-1050
(5/69)

UNITED STATES PATENT OFFICE
CERTIFICATE OF CORRECTION

Patent No. 3,501,984      Dated March 24, 1970

Inventor(s) Walter A. Hofmann

It is certified that error appears in the above-identified patent and that said Letters Patent are hereby corrected as shown below:

Column 12, line 17, after "relative" insert --movement--.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents